W. J. MEIKLEHAM.
DOUGH MIXING MACHINE.
APPLICATION FILED APR. 29, 1912.
1,065,382.
Patented June 24, 1913.
2 SHEETS—SHEET 2.
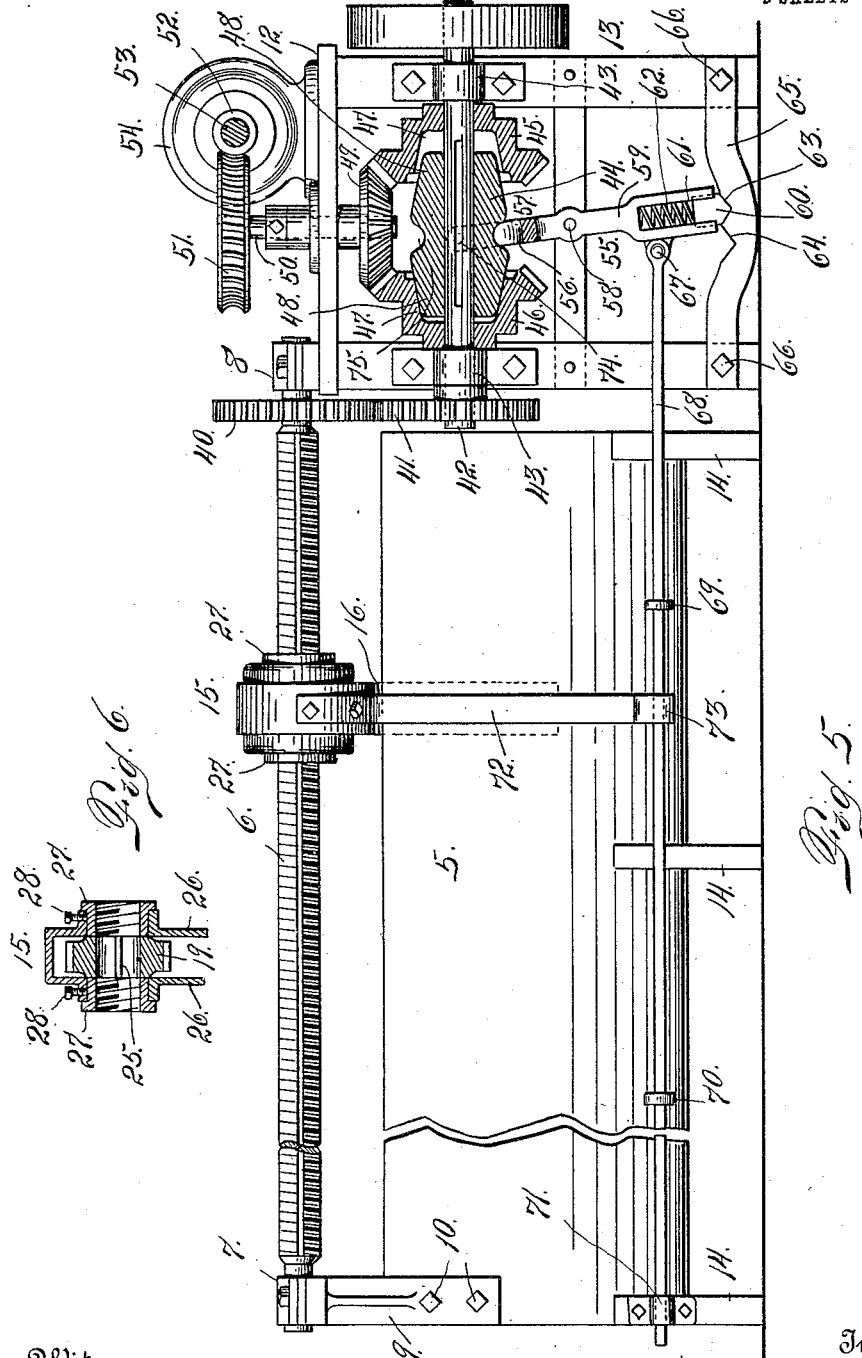
Witnesses
Otto E. Hoddick.
C. H. Roessner.
Inventor
W. J. Meikleham.
By A. J. O'Brien
Attorney

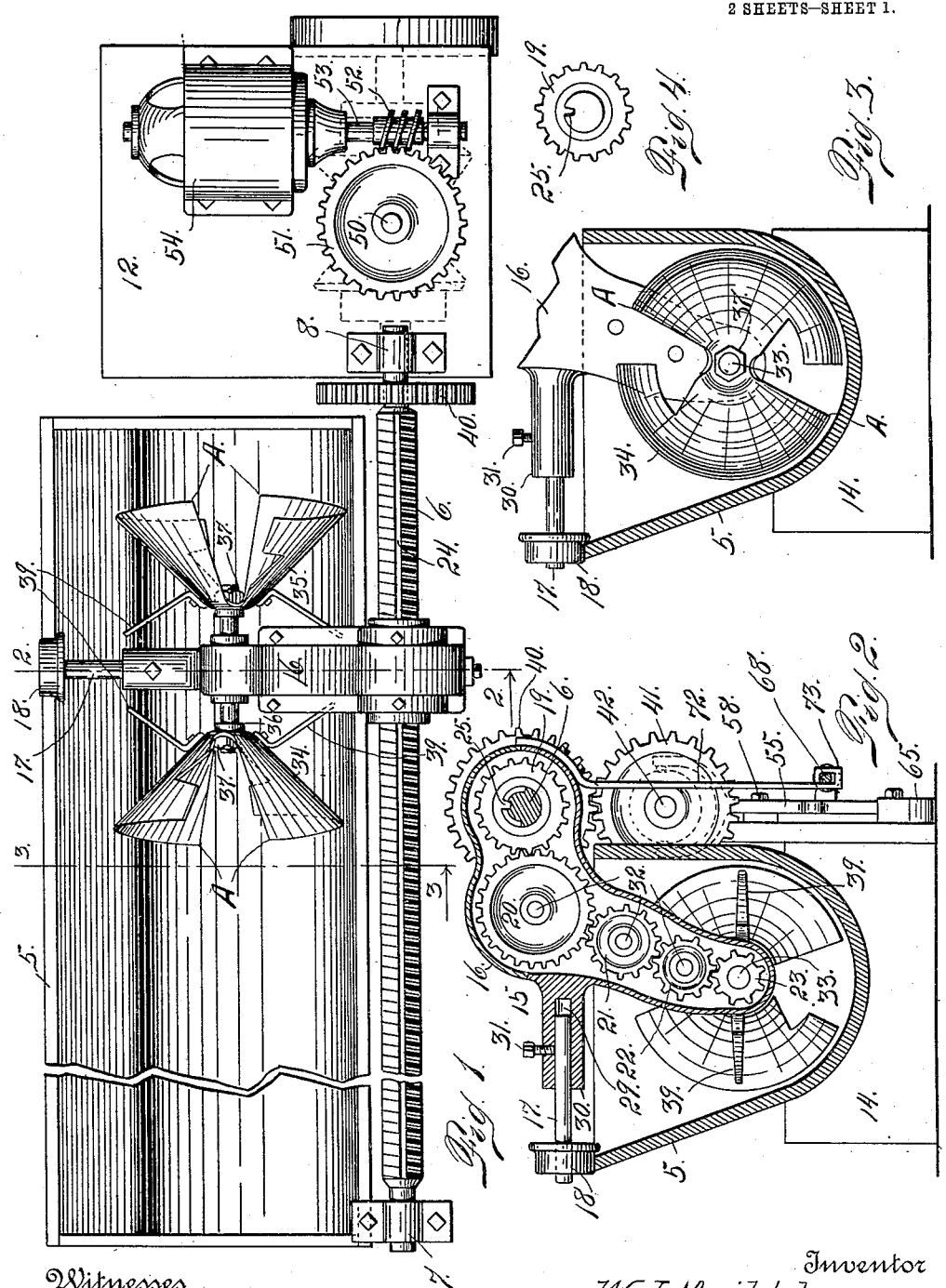

UNITED STATES PATENT OFFICE.

WILLIAM J. MEIKLEHAM, OF DENVER, COLORADO.

DOUGH-MIXING MACHINE.

1,065,382.  Specification of Letters Patent.  Patented June 24, 1913.

Application filed April 29, 1912. Serial No. 693,811.

*To all whom it may concern:*

Be it known that I, WILLIAM J. MEIKLEHAM, a citizen of the United States, residing in the city and county of Denver and State of Colorado, have invented certain new and useful Improvements in Dough-Mixing Machines; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in mixing machines, more especially adapted for use in mixing dough preparatory to setting it for rising. Heretofore, so far as I am aware, the machines intended for this purpose have been so constructed as to break the dough apart in the mixing trough during the mixing operation after it has become sufficiently stiff to have a tendency to adhere together in a mass. My improved machine is intended to overcome this difficulty and to maintain the batch of dough in an integral or unbroken mass after it has become sufficiently hardened to adhere, my improved machine being so constructed as to twist the dough into a sort of rope as the machine travels from one end of the trough to the other by means of a feed-screw.

To be more specific, my improved construction consists of a carriage equipped with rotary spiral mixing cones having their bases extending in opposite directions, the said cones being open on opposite sides to allow the stiffened dough to pass through as the mixers travel longitudinally of the trough. As the carriage travels in one direction, the mass of dough therein is twisted into a relatively large rope, while during the reverse travel of the mixing carriage, the said rope is untwisted but the mass of dough remains intact and unbroken from one end of the trough to the other. Provision is made for automatically reversing the rotary movement of the feed-screw when the mixing carriage has reached its limit of movement in either direction, whereby the carriage immediately begins its travel in the opposite direction.

Having briefly outlined my improved construction, I will now proceed to describe the same in detail, reference being made to the accompanying drawing in which is illustrated an embodiment thereof.

In this drawing: Figure 1 is a top-plan view of my improved machine, the trough and feed-screw being shown broken, to indicate that they may be of indefinite length. Fig. 2 is a cross-section taken on the line 2—2 Fig. 1 looking toward the right. Fig. 3 is a similar section taken on the line 3—3 also looking toward the right, the mixing carriage being partly broken away above the trough. Fig. 4 is an end elevation of the feed-screw. Fig. 5 is a side elevation of the trough, the means for automatically reversing the travel of the carriage being shown partly in section. Fig. 6 is a sectional view of a nut connected with the carriage and engaged by the feed-screw.

The same reference characters indicate the same parts in all the views.

Let the numeral 5 designate a trough, above and at one side of which is located a feed-screw 6 extending parallel with the lengthwise direction of the trough, the opposite extremities of the feed-screw being journaled in boxes 7 and 8, the box 7 being supported by a bracket 9 secured to the trough 10; while the box 8 is mounted on a top-plate 12 of a frame 13 located at the end of the trough, the latter being mounted on supports 14. Mounted to travel lengthwise of the trough is a carriage 15 including a gear-case 16, an axle 17 and a wheel 18 mounted on the axle. Within the gear-case is located a number of gears designated 19, 20, 21, 22 and 23 respectively. The gear 19 is mounted to slide freely on the feed-screw 6, the screw having a longitudinal groove 24 and the gear a feather or spline 25 engaging said groove. Secured to the gear-case and extending laterally from the side-walls 26 thereof, are two interiorly threaded nipples 27 which are secured to the gear-case by set-bolts 28, the said nipples constituting a nut engaged by the feed-screw 6 which passes therethrough, whereby, as the feed-screw is rotated, the nut, together with the gear-case, the axle 17 and the wheel 18, are caused to travel lengthwise of the trough, the wheel 18 resting on the upper edge of one side of the trough which forms a track for said wheel. The axle 17 of this wheel is longitudinally adjustable in a recess 29 formed in a projection 30 constituting an integral member of the gear-case 16. The axle is secured in the desired position of adjustment by a set-bolt or screw 21.

The gear-case 16 is of angular shape having one arm extending above the trough and another arm projecting downwardly thereinto. The three gears 20, 21 and 22 are provided with journals 32 engaging bearings formed in the opposite walls of the gear-case, while the gear 19, as heretofore explained, is mounted on the feed-screw 6. The gear 23 which occupies the lowest position in the gear-case, is mounted on and made fast to a relatively short shaft 33 passing through the gear-case and extending beyond the same on both sides thereof. To the opposite ends of this shaft 33 are secured two approximately cone-shaped spiral mixing members 34 and 35, the said members having openings at their smaller extremities through which the opposite ends of the shaft 33 extend, each shaft extremity having a collar 36 against which the smaller extremity of the mixing cones abuts on the outside, the cone being secured in place on the shaft by means of nuts 37 applied to the threaded ends of the shaft and engaging the cones on the inside and in opposing relation to the collars 36. These cone-shaped mixing members are thus arranged on opposite sides of the gear-case and journaled in the latter, the rotary movement being imparted through the instrumentality of the train of gears 19 to 23 inclusive, heretofore described.

Each cone-shaped mixing member is open on opposite sides, as shown at 38, to allow the dough to pass through the cones or to allow the cones to travel lengthwise of the trough, while the dough is arranged in the form of a rope extending longitudinally of the trough, the cones serving to twist the dough in opposite directions as the carriage travels back and forth lengthwise of the trough. In order to facilitate the twisting of the dough without breaking the mass, the cones may be exteriorly equipped with fingers 39 which extend inwardly toward the gear-case and have a tendency to supplement the action of the cones in the performance of the mixing operation.

In addition to the gears arranged within the traveling gear-case forming a part of the carriage, as heretofore explained, other gears are employed in connection with the mechanism, which will now be described in detail together with the apparatus for automatically reversing the rotary travel of the feed-screw 6.

Secured to one end of the feed-screw is a gear 40 which meshes with a gear 41 fast on a shaft 42 journaled in boxes 43 mounted on the frame-work 13. Upon this shaft midway between its journals, is slidably mounted a clutch-member 44 whose opposite extremities are arranged to coöperate with gears 45 and 46 which are normally loose on the shaft 42, while the clutch member 44, though slidable lengthwise thereof, is splined thereon to rotate therewith. The gears 45 and 46 are provided with cavities 47 adapted to receive the adjacent extremities 48 of the clutch member 44 which is of counterpart shape, the clutch member 44 being constructed to interlock with the gear 45 or 46, according to the lengthwise adjustment of the said clutch-member whereby either gear may be locked on the shaft 42, thus transmitting motion to the latter through the instrumentality of the construction, which will now be described in detail.

A beveled gear 49 meshes with both gears 45 and 46, the gear 49 being fast on a shaft 50 journaled in the top-plate 12 of the frame 13, the shaft 50 being vertically disposed and having a worm-wheel 51 fast on its upper extremity and engaged by a worm 52 on a shaft 53 of a motor 54 suitably mounted on the top-plate 12 of the frame-work 13.

From the foregoing description it will be understood that the rotation of the gear 49 imparts motion to the two gears 45 and 46 in opposite directions. Hence, when the clutch-member 44 is in engagement with the normally loose gears 45 and 46, motion will be imparted to the shaft 42 in opposite directions. It is this difference in rotary movement imparted to the shaft 42, which reverses the rotary movement of the feed-screw whereby the carriage is caused to travel longitudinally of the mixing trough in opposite directions. The manner of automatically shifting the clutch-member 42 to reverse the travel of the feed-screw and consequently of the carriage, will now be described.

The upper extremity of a lever 55 is pivotally connected with the clutch-member 44, the lever-arm which engages the said clutch-member being bifurcated as shown at 56 to straddle the clutch-member. The space 57 between the two gears 45 and 46 is sufficient to permit the lever the necessary oscillating movement to shift the clutch-member 44 for the purposes stated. This lever is fulcrumed on the frame 13 as shown at 58, its lower arm 59 carrying a plunger 60 slidable in a recess 61 and normally projected to its limit of movement by a spiral spring 62 located in the said recess. This plunger is adapted to engage either of two notches 63 or 64 formed in the stationary bar 65 mounted on the casing 13 and secured thereto by bolts 66. When the plunger 60 of the lever engages either of these recesses the spring acts thereon with sufficient force to maintain the lever in the adjusted position and thus maintain the clutch 48 in a corresponding position.

Pivotally connected with the lower arm of the lever 55 as shown at 67, is one extremity of a rod 68, the said rod extending parallel with the trough but located outside thereof, being slidably mounted as shown at 71 and equipped with stop-buttons 69 and 70, which are fast thereon and suitably separated. The gear-case is provided with a depending arm 72 which is shaped as shown at 73 to slidably encircle the rod 68. This opening is of such size that as the gear-case travels in response to the rotation of the feed-screw 6, the arm 72 will travel therewith without disturbing the rod 68 until this arm reaches one of the stops 69 or 70, as the case may be. These stops are so arranged that the arm 72 engages a stop when the gear-case and the mixer have reached approximately their limit of travel in either direction in the trough, and as soon as this occurs, the arm acts upon a stop to shift the rod longitudinally sufficiently to actuate the lever 55 and change the position of the clutch-member 48 whereby the latter is disengaged from one of the gears 45 or 46 and caused to engage the other in operative relation whereby rotary movement is imparted to the shaft 42 and consequently to the feed-screw 6 in reverse directions, thus causing the mixer to travel longitudinally back and forth in the trough 5 until the dough-mixing operation is complete, the cone - shaped mixers being rotated slowly simultaneously with their longitudinal travel in the trough.

From the foregoing description, the use and operation of my improved construction will be readily understood.

From what has been just explained, it will be plain that whenever the motor 54 is in operation, motion will be transferred to the feed-screw 6 in one direction or the other, according to the position of the clutch-member 48—that is to say, whether it is in engagement with the gear 45 or the gear 46. As these gears are normally loose on the shaft 42 and are both continuously and simultaneously rotated in opposite directions, the shaft 42 will be rotated in one direction or the other, depending upon the gear with which the clutch-member 48 is in operative engagement. The bifurcated arm 56 of the lever 55 straddles the clutch-member in the usual way, being provided with pins 74 on opposite sides which project into a circumferential groove 75 with which the clutch-member 48 is provided, whereby the clutch-member may rotate freely, independently of the lever. When the shaft 42 is in motion, motion is imparted therefrom to the feed-screw 6 through the medium of the two gears 41 and 40, and as the direction of rotation of the feed-screw is changed, the longitudinal travel of the carriage 15 and the mixing members mounted thereon is also changed. In this manner the mixing operation is carried on as long as may be desired. If we assume that the cone-shaped mixing members 34 and 35 are traveling with the carriage and in the trough 5 toward the left, and assume also that the dough has become sufficiently hard to adhere in a continuous mass, the longitudinally-disposed roll of dough, as it enters the cone-shaped mixing-member 34, will be forced toward the apex of the cone and divided, part of it passing through each of the openings 38 in opposite sides of the cone-shaped mixing-member. These two portions will enter the opposite sides of the mixing-member 35 and extend toward the right thereof as the carriage travels toward the left. During this time the roll of dough will be twisted to form a sort of rope as the mixing apparatus travels longitudinally of the trough, and when it reaches its limit of movement toward the left, the rotary movement of the feed-screw 6 will be reversed and the mixing apparatus will begin its travel toward the right whereby the roll of dough will be twisted in the opposite direction, but remaining intact and in the form of an unbroken roll or rope, which operation gives the highest degree of efficiency in an apparatus of this kind.

The two members of each cone are somewhat spiraled to give an auger or conveyer-screw action to the mixers. This facilitates the mixing operation and the performance of the said function in the manner heretofore explained. The two members of each cone are so arranged that when the longer part A of one member or blade is uppermost, the corresponding part of the other blade is lowermost. Furthermore, the two blades of the two cone members are so arranged with reference to each other that the blades having their parts A uppermost simultaneously, are diagonally arranged on the two cones, while it is also true of the parts A of the two mixing members which are lowermost, when the device is in the position illustrated in Fig. 1.

Having thus described my invention, what I claim is:

1. In a dough-mixing machine, the combination of a trough, and a rotary mixing device movable longitudinally in the trough and including cone-shaped members having their larger extremities pointed in opposite directions, the said members having openings to make room for the dough as the mixing device travels through the trough and acts on the dough.

2. The combination of a trough, and a mixing device rotatably mounted and longitudinally movable, means for imparting both rotary and longitudinal travel to the mixer in reverse directions, the said mixer having oppositely-disposed cone-shaped members open to allow the dough to pass through the longitudinal travel of the mixing device.

3. In a dough-mixing machine, the combination with a trough, of a carriage mounted to travel longitudinally thereon, and a mixing device mounted on the carriage, the said device including two cone-shaped members having their larger extremities pointed in opposite directions, the said members having openings to allow the dough to pass therethrough, and means for imparting rotary movement to the mixing device, simultaneously with the longitudinal travel of the carriage.

4. The combination of a trough, a mixing device mounted to rotate therein and travel longitudinally thereon, the said device including two cone-shaped members whose larger extremities are disposed in opposite directions, the said members being longitudinally separated and equipped with fingers projecting into the space between them.

5. The combination with a trough, of a carriage mounted to travel longitudinally thereon, a short shaft journaled in the carriage and projecting therefrom on opposite sides, mixing cones having their smaller extremities respectively secured to the opposite ends of the said shaft, the larger extremities of the cones projecting in opposite directions, the cones having openings to permit the passage of the material, and means for simultaneously imparting rotary longitudinal travel to the carriage and mixing cones substantially as described.

6. The combination with a trough, of a feed-screw journaled in suitable proximity thereto, a carriage equipped with a nut engaged by the feed-screw, and a gear splined thereon to rotate therewith, a short shaft journaled in the gear-case at the lower end thereof and carrying mixing devices, an operative connection between the gear on the feed-screw and the gear of the shaft carrying the mixing devices, and suitable means for imparting rotary movement to the feed-screw in reverse directions whereby longitudinal and rotary travel are imparted to the mixing devices in reverse directions, substantially as described.

7. The combination of a trough, a mixing device suitably mounted and longitudinally movable therein, the said device including two cone-shaped members, each composed of a pair of partially spiraled blades separated to allow the dough to pass through, the said members having their larger extremities disposed in opposite directions and the blades having the corresponding positions, diagonally arranged.

8. The combination of a trough, a mixing device rotatably mounted and longitudinally movable therein, the said mixing device including two pairs of partially spiraled blades, each pair of blades being arranged to form a cone-shaped device, the two cone-shaped devices having their larger extremities disposed in opposite directions, means for imparting rotary and longitudinal travel to the mixer, and means for automatically reversing such travel when the mixer reaches a predetermined location with reference to either end of the trough, substantially as described.

9. The combination of a trough, a carriage arranged transversely of the trough and resting on one edge thereof, the said carriage including a gear-case, gears located therein, a feed-screw journaled adjacent the trough and engaging a nut with which the gear-case is equipped, the said feed-screw also passing through one of the gears of the gear-case, the said gear being splined thereon to travel, a mixer carried by the gear-case and including a shaft journaled in the case, an operative connection between the said shaft and the gear on the feed-screw, the said shaft having its extremities extending beyond the gear-case in both directions and equipped with cone-shaped mixers composed of partially spiraled blades, means for imparting rotary movement to the feed-screw and means for automatically reversing the rotary travel of the screw when the gear-case has reached a predetermined limit in either direction, substantially as described.

10. The combination with a trough of a carriage arranged transversely of the trough, a feed screw journaled adjacent the trough and parallel with the length of the same, a nut mounted upon the carriage and engaging the feed screw, a gear loosely slidable upon the feed screw but splined upon it to rotate therewith, a rotating mixing device mounted upon said carriage and an operative connection between said mixing device and the gear.

11. In a dough-mixing machine, a trough and a rotating and reciprocating tool mounted within said trough, said tool consisting of a cone-shaped member arranged with its axis parallel to the length of the trough, said cone having one or more openings in its sides extending from the base toward the apex of the cone.

In testimony whereof I affix my signature in presence of two witnesses.

WILLIAM J. MEIKLEHAM.

Witnesses:
A. E. ADAMS,
A. M. NELSON.